United States Patent
Van Rheenen et al.

(10) Patent No.: US 8,124,664 B2
(45) Date of Patent: Feb. 28, 2012

(54) FLEXIBLE ACRYLIC FOAM COMPOSITION

(75) Inventors: Paul Van Rheenen, Warmister, PA (US); Sekhar Sunduram, Haverford, PA (US)

(73) Assignee: Rohm and Haas Company, Philadelphia, PA (US)

(*) Notice: Subject to any disclaimer, the term of this patent is extended or adjusted under 35 U.S.C. 154(b) by 348 days.

(21) Appl. No.: 12/589,986

(22) Filed: Oct. 30, 2009

(65) Prior Publication Data

US 2010/0113636 A1    May 6, 2010

Related U.S. Application Data

(60) Provisional application No. 61/197,780, filed on Oct. 30, 2008.

(51) Int. Cl.
*C08J 9/06* (2006.01)

(52) U.S. Cl. .......... 521/134; 521/149; 525/94; 525/163; 525/221; 525/222; 525/227; 525/228; 525/236

(58) Field of Classification Search .................. 521/134, 521/149; 525/94, 163, 221, 222, 227, 228, 525/236
See application file for complete search history.

(56) References Cited

U.S. PATENT DOCUMENTS

| 3,565,247 A | 2/1971 | Brochman |
| 4,223,067 A | 9/1980 | Levens |
| 2005/0250880 A1 | 11/2005 | Troy et al. |
| 2006/0036030 A1* | 2/2006 | Kurihara et al. ............... 525/63 |

FOREIGN PATENT DOCUMENTS

| JP | 2004002844 A | * | 1/2004 |
| WO | WO 00/06637 | | 2/2000 |
| WO | WO2006/132231 | * | 12/2006 |

OTHER PUBLICATIONS

Handbook of Pressure Sensitive Adhesive Technology, Third Edition, pp. 36-61 published by Satas & Associates 1999.
Polymer Handbook, Fourth Edition, VII, pp. 675-714 published by Wiley Interscience Co. 1999 and Computational Modeling of Polymers by Jozef Bicerano, published, CRC Press 1992.
Handbook Of Polymeric Foams and Foam Technology, Hansen, NY, 1991, (Klempner, D., Frisch, K. C. editors).

* cited by examiner

*Primary Examiner* — Irina S Zemel
(74) *Attorney, Agent, or Firm* — Tifani M. Cottingham

(57) ABSTRACT

The present invention relates to an acrylic foam composition comprising an acrylic polymer and an acrylic processing aid which exhibits increased flexibility characteristics over other types of foam compositions.

8 Claims, No Drawings

FLEXIBLE ACRYLIC FOAM COMPOSITION

This application claims the benefit of priority under 35 U.S.C. §119(e) of U.S. Provisional Patent Application No. 61/197,780, filed on Oct. 30, 2008.

The present invention relates to a flexible acrylic foam composition. More particularly, it relates to an acrylic foam composition which exhibits increased flexibility characteristics over other types of foam compositions.

Several attempts have been made to create acrylic foam because of the need on the market for foam products combining flexibility with other advantages such as good performance/cost ratio, customized properties, good weatherability, and good bio compatibility with human tissue.

Although acrylic polymers provide these added benefits, making flexible acrylic polymers requires the use of acrylate monomer which results in a polymer with low Tg. The problem with acrylic polymers with low Tg is that they are inherently tacky. This represents a critical problem for foam construction since cells collapse irreversibly when foam is compressed. As described in U.S. Pat. No. 3,565,247, when compressed to half its original thickness, tacky acrylic foam typically shows less than 5 percent recovery.

Two solutions have been proposed for making flexible acrylic foams which do not collapse when stressed. One such solution disclosed in U.S. Pat. No. 4,223,067 fills acrylic pressure sensitive adhesive (PSA) (co)polymers with hollow glass microspheres. The microcellular structure is provided by the air inside the hollow glass microspheres. Here the cells collapse is prevented by the thin glass wall of the microspheres. Even if this proposal resolves the cells collapse issue, this solution requires a more complicated and expensive process than the typical processing techniques used for foaming plastics because it requires that a mixture of monomers and glass microspheres (i.e diameter: 10-200 µm) be coated onto a backing sheet and then polymerized in situ to a pressure-sensitive adhesive state.

Another attempt to make flexible acrylic foam is disclosed in WO 2000/006637. This reference discloses the foaming of acrylic hot melt adhesive (co)polymers with expandable polymeric microspheres. The microcellular structure is provided by the volatilization of the hydrocarbons inside the expandable microspheres while the cells collapse is prevented by the polymeric shell of the microspheres.

In both case the resultant foams obtained are very tacky even if the use of hollow glass microspheres in one case and expandable polymeric microspheres in the other case prevents the cells collapse. Thus because the surfaces of the foams are tacky their primary use is limited to adhesives tapes applications. Thus a need still exists for an acrylic foam composition that is not inherently tack that may be used for a broad range of applications.

The present invention solves the problem of cell collapse by providing a foam composition that is acrylic in nature that in combination with a selected processing aid imparts improved properties to the foam that make the foam resistant to cell collapse. These improved properties enable the foam to be useful for several applications such as for example, adhesive (substrate for PSA foam tapes), building and construction (sound/vibration absorption, window mounting/sealing, insulation materials, reflective roof coating), electronic (mounting tapes for electronic device, CMP polishing pads), water filtration membrane, sport (wetsuit, drysuit, general sportswear), and cushioning materials.

According to the present invention, there is provided a flexible acrylic polymer foam composition comprising:

A) an acrylic polymer comprising at least one acrylic tri-block copolymer;
B) at least one processing aid wherein the at least one processing aid comprises
   i) a copolymer comprising at least two acrylic monomers;
   ii) a Tg between −50° C. and 130° C.;
   iii) a molecular weight comprised between 500,000 and 9,000,000; and
   iv) a difference of solubility parameters with at least one of the blocks of the tri-block copolymer of the acrylic polymer of equal to or less than 0.6 MPa$^{1/2}$; and
C) at least one blowing agent As used herein, tack is defined as the ability of a material to adhere instantaneously to a solid surface when brought into contact without the application of external pressure as described in "Handbook of Pressure Sensitive Adhesive Technology, Third Edition", pp. 36-61 (published by Satas & Associates in 1999). More specifically, as used herein foam is said "tacky" if it adheres on itself when two parts of the same foam are put in contact and the bond does not release under the own weight of the foam.

Flexible plastic foam is herein defined as plastic foam having an elongation at break greater than 200% (of the original length) and a tensile break strength less than 15 MPa at 23° C.

As used herein, a polymer will have a "good processability" if the parameters required for its transformation (i.e. temperature, torque, etc) are in the normal range of the equipment and don't require any expensive and/or commercially unavailable part addition to the common plastic processing equipment.

Solubility Parameters (unit: MPa$^{1/2}$) are values which allow the quantification of the solubility between two chemicals. Solubility Parameters can be calculated by the Fedors method as described in "POLYMER HANDBOOK Fourth Edition", VII, pp. 675-714 (published by Wiley Interscience Co. in 1999) and in "Computational Modeling of Polymers" by Jozef Bicerano (published by CRC Press in 1992).

Flexible acrylic foam is herein defined as a flexible plastic foam wherein the plastic is a formulation containing at least one acrylic polymer (A) and at least one acrylic processing aid (B).

Acrylic polymer (A) can be mixtures of homo and/or random and/or graft and/or block (co)polymer(s) with acrylic tri-block polymers made of at least 60 wt. % of acrylic monomers.

As used herein, an acrylic processing aid (B) is said "compatible" with an acrylic polymer (A) when the difference between the solubility parameter of (A) and (B) is preferably 0.6 MPa$^{1/2}$ or less and more preferably 0.3 MPa$^{1/2}$ or less.

Acrylic monomers include all monomeric acrylic or methacrylic esters of non-tertiary alkyl alcohols, with the alkyl groups having from 1 to 20 carbon atoms or alternatively from 1 to 8 carbon atoms. Suitable acrylate monomers include but are not limited to methyl acrylate, ethyl acrylate, n-butyl acrylate, lauryl acrylate, 2-ethylhexyl acrylate, cyclohexyl acrylate, iso-octyl acrylate, octadecyl acrylate, nonyl acrylate, decyl acrylate, isobornyl acrylate, and dodecyl acrylate. Also useful are aromatic acrylates, (e.g., benzyl acrylate). Suitable methacrylate monomers include but are not limited to methyl methacrylate, ethyl methacrylate, n-butyl methacrylate, lauryl methacrylate, 2-ethylhexyl methacrylate, cyclohexyl methacrylate, iso-octyl methacrylate, octadecyl methacrylate, nonyl methacrylate, decyl methacrylate, isobornyl methacrylate, and dodecyl methacrylate.

Tri-block acrylic copolymers are very promising type of thermoplastic elastomer (TPE) which combine elastomeric properties (rubber-like) with the processability of typical thermoplastic. This combination of properties is linked to the phase separations of different blocks into domains which occur at the nanoscopic scale. It is assumed that these phase separations provide thermally reversible crosslinking. Therefore, at solid state the properties are similar to one of crosslinked elastomers. At molten state, when processed above the $T_g$ of all blocks, phase separations of block domains are broken down enabling the free flow polymeric chains which is translated, at a macroscopic scale into low melt viscosity and melt strength since the polymer $M_w$ is typically only on the order of 100,000.

Non-limiting examples tri-block acrylic copolymers useful in the present invention are disclosed in U.S. Pat. No. 2006/0036030. Such block acrylic copolymers comprise at least one block made of acrylic homo- or copolymer of acrylic monomer with a resulting Tg inferior to 50° C. and a block length comprising between 1,000 and 500,000 or alternatively at least one block made of acrylic homo- or copolymer of acrylic monomer with a resulting Tg superior to 50° C. and a block length comprises between 1,000 and 500,000.

Tri-block acrylic copolymers can be made by anionic, radical or any other known polymerization method for producing an acrylic block copolymer, such the methods described in U.S. Pat. No. 2006/0036030 or alternatively in JP Pat. No. 2002/241568.

Acrylic polymer (A) can comprises 10 to 100 wt %, preferably 50 to 90 wt %, of one or more tri-block acrylic copolymers, and 0 to 90 wt %, preferably 10 to 50 wt %, of one or more low Tg acrylic polymers. Low Tg acrylic polymers are homo, random or block copolymers of acrylic monomers having a Tg less than 0° C., preferably less than −20° C., such as low Tg Pressure Sensitive Adhesive acrylic copolymer or impact modifier for plastics. Non-limiting examples of low Tg acrylic polymers include Robond PS-90, Robond™ Prohesion, Robond™ PS-8915 Paraloid™ KM-334 and Paraloid™ KM-377 commercially available from Rohm and Haas Company. Tri-block polymers may be present in the invention alone or in mixture.

In addition to the acrylic polymer (A), the flexible acrylic foam of the present invention comprises at least one acrylic processing aid (B). Acrylic processing aids are high molecular weight polymer mainly made of acrylic monomers. The processing aid (B) of the present invention comprises a copolymer obtained by the polymerization of acrylic monomers or a mixture of acrylic monomers along with at least one other copolymerizable monomer. The copolymer may be in powder form. Their molecular weight range from 500,000 to 9,000,000 which is very high in comparison with the typical molecular weight of PVC chains which is around 80,000. They may be used alone or in combination in the present invention.

Processing aids have different effects on the processing of PVC formulation. They are well known for promoting fusion of PVC which allows the processing of PVC at temperatures that are low enough to minimize degradation and they adjust melt strength which greatly improve the processability of PVC formulations.

In the present invention, specific acrylic processing aid copolymers can be used for adjusting the melt properties of tri-block acrylic copolymers and therefore enable the foaming of an acrylic polymer composition while controlling the final foam cell structure. The acrylic processing aid copolymers of the present invention have a Tg and Mw enabling the foam cell stabilization without decreasing drastically the foam flexibility, are compatible with at least one of the blocks.

The acrylic polymer-based foam composition of the present invention comprises between 60 wt. % and 99 wt. %, or alternatively between 80 wt. % and 95 wt. %, of the acrylic polymer (A) and between 1 wt. % and 40 wt. %, or alternatively between 5 wt. % and 20 wt. % one or more of the processing aid (B) or of a combination of one or more processing aids with one or more co-processing aids.

Acrylic monomers include all monomeric acrylic or methacrylic esters of non-tertiary alkyl alcohols, with the alkyl groups having from 1 to 20 carbon atoms or alternatively from 1 to 8 carbon atoms. Suitable acrylate monomers include but are not limited to methyl acrylate, ethyl acrylate, n-butyl acrylate, lauryl acrylate, 2-ethylhexyl acrylate, cyclohexyl acrylate, iso-octyl acrylate, octadecyl acrylate, nonyl acrylate, decyl acrylate, isobornyl acrylate, and dodecyl acrylate. Also useful are aromatic acrylates (e.g. benzyl acrylate). Suitable methacrylate monomers include but are not limited to methyl methacrylate, ethyl methacrylate, n-butyl methacrylate, lauryl methacrylate, 2-ethylhexyl methacrylate, cyclohexyl methacrylate, iso-octyl methacrylate, octadecyl methacrylate, nonyl methacrylate, decyl methacrylate, isobornyl methacrylate, and dodecyl methacrylate. The content of the acrylic monomers is in the range of 60 to 100% by weight and alternatively 70 to 90% by weight of (B).

Examples of the other monomers copolymerizable therewith with include acrylic esters such as ethyl acrylate, n-butyl acrylate, 2-ethylhexyl acrylate, benzyl acrylate and phenyl acrylate; aromatic vinyl compounds such as styrene, a-methylstyrene and vinyltoluene; vinyl cyanide compounds such as acrylonitrile and methacrylonitrile; vinyl esters such as vinyl acetate; and acid anhydrides such as maleic anhydride. However, it is to be understood that the present invention is not limited to these specific examples. These other copolymerizable monomers may also be used alone or in admixture of two or more, depending upon the intended purpose. The content of the other monomers copolymerizable is in the range of 0 to 40% by weight and alternatively 10 to 30% by weight of (B).

Moreover, multifunctional monomers such as divinylbenzene, allyl methacrylate, 1,3-butanediol dimethacrylate and triallyl cyanurate may be used as constituents of the processing aid (B) in accordance with the present invention. The content of these monomeric units is in the range of 0.001 to 2.0% by weight and alternatively 0.2 to 1.0% by weight.

In order for the processing aid (B) to exhibit its improved effects, it is important that the above-described acrylic copolymer (B) is compatible with the acrylic polymer (A).

In the present invention the Tg of the processing aid (B) is between −50° C. and 130° C. and alternatively between 40° C. and 130° C. The Mw of the processing aid (B) is between 500,000 and 9,000,000, or alternatively between 1,000,000 and 7,500,000.

In order to prepare the processing aid (B) in accordance with the present invention, there may be employed various methods. For example, useful polymerization techniques include emulsion polymerization, suspension polymerization, solution polymerization and the like. Moreover, the monomers may be added at a time, dropwise or in portions, and either random copolymerization or block copolymerization technique may be employed. In one embodiment of the invention, the processing aid is prepared using a random copolymer obtained by adding the monomers at a time.

When emulsion polymerization is employed, no particular limitation is placed on the type of the emulsifier used thereof, and various emulsifiers may be used. They include, for example, anionic surface-active agents such as fatty acid salts, alkylsulfate salts, alkylbenzenesulfonate salts, alkylphosphate salts and dialkylsulfosuccinate salts; nonionic surface-active agents such as polyoxyethylene alkyl ethers, polyoxyethylene fatty acid esters, sorbitan fatty acid esters and glycerol fatty acid esters; and cationic surface-active agents such as alkylamine salts. These emulsifiers may be used alone or in combination.

Depending upon the type of the emulsifier used, the pH of the polymerization system may become alkaline. In such a case, a suitable pH regulator may be used in order to prevent the hydrolysis of the alkyl methacrylate. Usable pH regulators include boric acid-potassium chloride-potassium hydroxide, potassium dihydrogen phosphate-disodium hydrogen phosphate, boric acid-potassium chloride-potassium carbonate, citric acid-potassium hydrogen citrate, potassium dihydrogen phosphate-borax, sodium dihydrogen phosphate-citric acid, and the like.

The polymerization initiator may be selected from among water-soluble or oil-soluble sole initiators and redox initiators. For example, common inorganic initiator such as persulfates may be used alone, or used as redox initiators by combining them with a sulfite, hydrogen sulfite, thiosulfate or the like. Moreover, organic peroxides (e.g., t-butyl hydroperoxide, cumene hydroperoxide, benzoyl peroxide and lauroyl peroxide), azo compounds and the like may be used alone, or used as redox initiators by combining them with sodium formaldehyde sulfoxylate or the like. However, it is to be understood that the present invention is not limited to these specific examples.

Where the processing aid (B) in accordance with the present invention is prepared, for example, by emulsion polymerization, the product may be recovered by cooling the resulting alkyl methacrylate polymer latex, precipitating the polymer by acid coagulation or salting-out with an electrolyte such as an acid (e.g., sulfuric acid, hydrochloric acid or phosphoric acid) or a salt (e.g., aluminum chloride, calcium chloride, magnesium sulfate, aluminum sulfate or calcium acetate), filtering off the precipitate, and washing and drying it. Alternatively, the product may also be recovered by subjecting the resulting polymer latex to various processes such as spray drying and freeze-drying.

Processing aid (B), or combination of processing aids, can also be blended with 0 to 90 wt %, preferably 20 to 70 wt %, of one or more co-processing aids. Co-processing aids are homo- or random copolymers of acrylic monomers. The Tg of the co-processing aid is less than 40° C., preferably less than 0° C. The Mw of the co-processing aid is typically between 500,000 and 9,000,000, or alternatively between 1,000,000 and 7,500,000. The molecular weight of the polymer was determined by Gel Permeation Chromatography, using the High-MW-Low-Tg (HMLT) method and conditions noted in US2005/0250880.

Co-processing aids may be made of the same acrylic monomers as those described for the processing aid (B).

Co-processing aid may be made by any known polymerization method for producing an acrylic copolymer, such the methods described in U.S. Pat. No. 2005/0250880.

No particular limitation is placed on the method for preparing the acrylic polymer-based foam composition of the present invention, and there may be employed any commonly known melt kneading method. For example, an acrylic foam composition may be prepared by blending a specified amount of the acrylic polymer (A) with a specified amount of the processing aid (B) in a Henschel mixer, Banbury mixer, V-type mixer, ribbon blender or the like, and passing the resulting blend through a kneading and extruding machine such as, for example a single-screw or twin-screw extruder. Thus, the acrylic foam composition may be prepared in any of various desired forms.

The acrylic polymer-based foam compositions thus obtained may be applied to sheet or profile foam extrusion and other conventional molding processes such as injection molding, blow molding and extrusion molding, and thereby made into various types of molded articles.

Gaseous phase of the acrylic foam of the present invention can be provided by any known method such as the decomposition of a chemical blowing agent, the volatilization of a physical blowing agent or the addition of hollow microspheres. The amount of these products is variable but should provide a final cellular structure having a gas fraction comprises between 5% by volume and 90% by volume, or alternatively between 30% by volume and 80% by volume.

Chemical Blowing Agents useful in the present invention to create the acrylic polymer based foam composition do not require an injection system as does a physical blowing agent and they can be used in virtually any extrusion system. Examples of chemical blowing agents include water and azo-, carbonate-, and hydrazide-based molecules including, e.g., 4,4'-oxybis(benzenesulfonyl)hydrazide, such as CELOGEN OT (available from Uniroyal Chemical Company, Inc., Middlebury, Conn.), 4,4'-oxybenzenesulfonyl semicarbazide, p-toluenesulfonyl semicarbazide, p-toluenesulfonyl hydrazide, oxalic acid hydrazide, diphenyloxide-4,4'-disulphohydrazide, benzenesulfonhydrazide, azodicarbonamide, azodicarbonamide (1,1'-azobisformamide), meta-modified azodicarbonides, 5-phenyltetrazole, 5-phenyltetrazole analogues, hydrazocarboxylates, diisopropylhydrazodicarboxylate, barium azodicarboxylate, 5-phenyl-3,6-dihydro-1,3,4-oxadiazin-2-one, sodium borohydride, azodiisobutyronitrile, trihydrazinotriazine, metal salts of azodicarboxylic acids, tetrazole compounds, sodium bicarbonate, ammonium bicarbonate, preparations of carbonate compounds and polycarbonic acids, and mixtures of citric acid and sodium bicarbonate, N,N'-dimethyl-N,N'-dinitroso-terephthalamide, N,N'-dinitrosopentamethylenetetramine, and combinations thereof.

Physical blowing agents may also be used in the present invention. Such physical blowing agents are any naturally occurring atmospheric material which is a vapor at the temperature and pressure at which the foamed film exits the die. The physical blowing agent may be introduced into the polymeric material as a gas, liquid, or supercritical fluid. The physical blowing agent may be injected into the extruder system. If a physical blowing agent is used, it is preferable that it is soluble in the polymeric material being used. The physical blowing agents used will depend on the properties sought in the resulting foam articles. Other factors considered in choosing a blowing agent are its toxicity, vapor pressure profile, and ease of handling. Blowing agents, such as pentane, butane, and other organic materials, such as hydrofluorocarbons (HFC) and hydrochlorofluorocarbons (HCFC) may be used, but non-flammable, non-toxic, non-ozone depleting blowing agents are preferred because they are easier to use, e.g., fewer environmental and safety concerns. Suitable physical blowing agents include, for example, carbon dioxide, nitrogen, SF6, nitrous oxide, perfluorinated fluids, such as $C_2F_6$, argon, helium, noble gases, such as xenon, air (nitrogen and oxygen blend), and blends of these materials, hydrofluorocarbons (HFC), hydrochlorofluorocarbons (HCFC), and hydrofluoroethers (HFE).

Hollow glass microspheres may be used in the acrylic foams of the present invention. Diameters of such hollow glass microspheres is comprised between 10 and 200 micrometers, or alternatively between 20 and 80 micrometers. Examples of suitable commercially available hollow glass microspheres include those available from Potters Industries under the designations SPHERICEL 110P8 or SPHERICEL 60P18.

Additionally, expandable polymeric microspheres can be used as the foaming agent in the acrylic foams of the invention. An expandable polymeric microsphere comprises a polymer shell and a core material in the form of a gas, liquid, or combination thereof. Upon heating to a temperature at or below the melt or flow temperature of the polymeric shell, the polymer shell will expand. Examples of suitable core materials include propane, butane, pentane, isobutane, neopentane, or similar material, and combinations thereof. The identity of the thermoplastic polymer used for the polymer microsphere shell can influence the mechanical properties of the foam, and the properties of the foam may be adjusted by the choice of microsphere, or by using mixtures of different types of microspheres. Examples of suitable thermoplastic polymers which may be used as the shell include acrylic and methacrylic acid esters, such as polyacrylate; acrylate-acrylonitrile copolymer; and methacrylate-acrylic acid copolymer. Vinylidene chloride-containing polymers, such as vinylidene chloride-methacrylate copolymer, vinylidene chloride-acrylonitrile copolymer, acrylonitrile-vinylidene chloride-methacrylonitrile-methyl acrylate copolymer, and acrylonitrile-vinylidene chloride-methacrylonitrile-methyl methacrylate copolymer may also be used, but may not be desired if high strength is sought. Halogen free microspheres may also be used in the foams of the invention. Examples of suitable commercially available expandable polymeric microspheres include those available from Pierce Stevens (Buffalo, N.Y.) under the designations F-30D, F-50D, F-80SD, and F-100D. Also suitable are expandable polymeric microspheres available from Expancel, Inc. (Duluth, Ga.) under the designations EXPANCEL 551, EXPANCEL 461, EXPANCEL 091, and EXPANCEL 092 MB 120. The selection of expandable polymeric microsphere is typically based on its expansion temperature and on the thermally conductive filler used.

Additional chemical blowing agents, physical blowing agents, hollow glass microspheres and polymeric microspheres are described in Klempner, D., Frisch, K. C. (editors), Handbook of Polymeric Foams and Foam Technology (Hansen, N.Y., 1991).

Additives including lubricant, fillers, pigments, flame retardant, antistatic agent, anti fogging agent, antimicrobial agents, antioxidant, UV stabilizers, plasticizers (e.g. DEHP), may optionally be added to the composition of flexible acrylic foam according to the intended purpose, so long as the effects of the present invention are not detracted from.

Lubricants useful in the present invention include, for example, pure hydrocarbon lubricants such as liquid paraffin, natural paraffin, microcrystalline wax, synthetic paraffin and low-molecular-weight polyethylene; halogenated hydrocarbon lubricants; fatty acid lubricants such as higher fatty acids and hydroxy-fatty acids; fatty acid amide lubricants such as fatty acid amides and bis (fatty acid amide)s; and ester lubricants such as lower alcohol esters of fatty acids, polyhydric alcohol esters of fatty acids (e.g., glycerides), polyglycol esters of fatty acids, and fatty alcohol esters of fatty acids (i.e., ester waxes). In addition, the also include metal soaps, fatty alcohols, polyhydric alcohols, polyglycols, polyglycerols, partial esters derived from fatty acids and polyhydric alcohols, and partial esters derived from fatty acids and polyglycols or polyglycerols. These lubricants may be used alone or in admixture of two or more.

Lubricants are typically use for modifying rheology of melt polymer. Internal lubricants are well known for mainly decreasing the shear viscosity of melt polymer while external lubricants are well known for decreasing friction occurring between melt polymer and metal wall of processing equipment. Lubricants can be used for modifying the surface of finished plastic products. For example, the use of lubricant in flexible acrylic foam enables the control of water absorption properties which are related to the amount of open cells at the surface of the extruded foams. Lubricants may be present in the invention from 0.5-5 wt % or alternatively from 1-2 wt %.

Fillers and pigments useful in the present invention include, for example, carbonates such as ground calcium carbonate, precipitated calcium carbonate and colloidal calcium carbonate; inorganic fillers such as aluminum hydroxide, magnesium hydroxide, titanium oxide, clay, mica, talc, wollastonite, zeolite, silica, fumed silica, zinc oxide, magnesium oxide, carbon black, graphite, glass beads, glass fiber, carbon fiber and metal fibers; and organic fibers such as polyamide fibers. These fillers may be used alone or in admixture of two or more.

Flame/fire retardants include chlorinated paraffin, aluminum hydroxide, antimony trioxide and halogen compounds. Examples of suitable fire retardants for use in the foam described herein include those commercially available from Clariant Corporation of Charlotte, N.C., under the designation EXOLIT, including those designated IFR 23, AP 750, EXOLIT OP grade materials based on organophosphorous compounds, and EXOLIT RP grades of red phosphorus materials non-halogenated fire retardants, such as FIREBRAKE ZB and BORGARD ZB, and FR 370 (tris(tribromoneopentyl) phosphate), available from Dead Sea Bromine Group, Beer Shiva, Israel. Examples of suitable fire retardants that also function as thermally conductive fillers include aluminum hydroxide and magnesium hydroxide.

In the following examples and comparative examples, all parts are by weight and the procedures for evaluation were as follows.

EXAMPLES

Formulation Preparation

The acrylic foam formulations were prepared by blending directly all of the formulation components (i.e. Tri-block Acrylic Copolymer(s)+acrylic processing aid(s)+blowing agent(s)+additive(s)), under pellets or powder form, in a mixer.

Since formulations components were either under pellet form (e.g. Tri-block Acrylic Copolymer) or powder form (e.g. processing aids, blowing agents), the pellets of Tri-block Acrylic Copolymers were repelletized, before blending with other components, in order to have smaller pellets and therefore, a more homogenous blending between all the formulation component under different physical forms (i.e. pellets or powder).

Tri-block Acrylic Copolymers (LA2250) were repelletized using a Randcastle Microextrusion line (Model 0625). The extruder was equipped with a single screw with three heating and cooling zones. The barrel temperatures were set at 149° C./149° C./149° C. and the die temperature was set at 149° C. The screw speed was set at 50 rpm. The Tri-block Acrylic Copolymers were extruded into a single strand through a 2 mm diameter die and chopped into pellets. The diameter of pellets was approximately reduced from 5 mm to 2 mm.

Commercial Materials and Suppliers Used in the Examples are shown in Table 1

TABLE 1

| Product Name | Description | $T_g$ (° C.) Soft/Hard | Producer | Physical Form |
|---|---|---|---|---|
| LA2250 | Tri-block acrylic copolymer | −54/105 | Kuraray | Pellets |
| LA410L | Tri-block acrylic copolymer | −54/105 | Kuraray | Pellets |
| Paraloid ™ K-120ND | High Molecular Weight Acrylic copolymer | 75 | Rohm and Haas Company | Powder |
| Paraloid ™ K-130D | High Molecular Weight Acrylic copolymer | 65 | Rohm and Haas Company | Powder |
| Paraloid ™ K-445 | High Molecular Weight Acrylic copolymer | 67 | Rohm and Haas Company | Powder |
| Ficel HRVP01 | azodicarbonic acid diamide preparations CAS # 123-77-3 (ADC) | NA | Lanxess | Powder |
| Ceraflour 961 | Lubricant | NA | BYK | Powder |
| AdvalubeF1005 | Lubricant | NA | Rohm and Haas Company | Powder |
| Omyacarb UF | Calcium Carbonate | NA | Omya | Powder |
| Paraloid ™ B-67 | Low Tg acrylic copolymer | 50 | Rohm and Haas Company | Pellets |
| ROBOND ™ Prohesion 3000 | Low Tg acrylic copolymer | −34 | Rohm and Haas Company | Emulsion |
| Elastene ™ A10 | Low Tg acrylic copolymer | −40 | Rohm and Haas Company | Emulsion |

Foam Extrusion

The formulations were fed into the hopper to the feed port in barrel section 1 of a 19 mm counter rotating twin screw (length: 300 mm) extruder with three heating zones (Haake Buehler) operating at a screw speed set point of 50 rpm. The extruder was powered and controlled by a rs5000 unit from Rheometer Services Inc. The barrel temperatures were set at 130° C./175° C. /185° C.

The formulations were extruded into a sheet through a 10.16 cm wide single layer flat die with a gap of about 0.3 cm. The die temperature was set at 150° C.

The extruded sheet was cast into a nip formed by the two metal rolls of a Postex Fisons Haake pulling unit, rotating at a speed set point of 50 rpm.

Test Methods

In the test methods and examples below, the sample dimensions (typically the length) are approximate except for the width wherein the width was measured to the accuracy of the cutting tool.

All parts, percentages, ratios, etc. in the examples and the rest of the specification are by weight unless indicated otherwise.

Molecular Weight Determination

The molecular weight of the polymer was determined by Gel Permeation Chromatography, using the HMLT (High-MW-Low-Tg) method and conditions noted in US2005/0250880.

Density Determination

Density was determined according to ASTM D 792-86 "Standard Test Method for Density and Specific Gravity (Relative Density) of Plastics by Displacement." Samples were cut into approximately 2.54 cm×2.54 cm (1 in×1 in) specimens and weighed on a Mettler analytical balance (Model AE200) with a precision of 0.0001 g.

This measurement provides the mass (m) of specimen and therefore its density as follows:

$$m = \rho_f V_f$$

Where:
$\rho_f$: density of foam (g.cm$^{-3}$)
$V_f$: volume of the specimen (cm$^3$)

The volume of each sample was obtained by measuring the mass of water displaced at room temperature (23° C.±1° C.). The buoyancy (b) of each sample was measured in grams (g) using a special attachment for the balance.

$$b = \rho_w V_f$$

Where:
$\rho_w$: density of water (g.cm$^{-3}$)
$V_f$: volume of the specimen (cm$^3$)

The density ($\rho_f$) of the sample was taken to be its mass divided by its buoyancy, assuming the density of water at 23° C. to be 1 g.cm$^{-3}$:

$$\rho_f = \frac{b}{m}$$

Average Cell Diameter and Cell Homogeneity Determination

The sample preparation consisted in manually cutting with a razor blade a thin cross section of the foam sample in the transverse direction from the article to be tested.

These specimens were then analyzed using an Olympus BX50 optical microscope equipped with a Spot INSIGHT Color camera and linked to a computer. The microscope was set up with the maximal light intensity and a magnification of 10×. Three pictures per sample were taken and directly analyzed with the software Spot Advanced (Windows Version 4.6). After length calibration, the cells on each picture were manually drawn using an ellipse shape for which the software calculated the proper lengths in micron (μm) of the Major Axis and Minor Axis.

The results were then exported in Microsoft Excel and averaged to provide the Average Cell Diameter (μm).

The Cell Homogeneity (mm$^{-1}$) is defined as the inverse of the standard deviation of the Average Cell Diameter (μm).

Therefore, a high value of Cell Homogeneity means that the cellular structure is homogenous (i.e. the real cell diameters are very close from the Average Cell Diameter) and a low value of Cell Homogeneity means that the cellular structure is heterogeneous (i.e. the range of real cell diameters is broad).

Tensile Break Strength and Elongation at Break Determination

Tensile and elongation were determined according to ASTM D412-06a "Standard Test Methods for Vulcanized Rubber and Thermoplastic Elastomers-Tension."

A sample was cut using a dumbbell die in the machine direction from the article to be tested to form the test specimen. Sample thickness was measured in the center of each specimen using a Mitutoyo Absolute gauge indicator (Model ID-C112T) having a precision of 0.001 mm and a 5.0 mm diameter foot.

The Tensile Break Strength ($\sigma_{break}$) was determined as follows:

$$\sigma_{break} = \frac{F_{break}}{A}$$

Where:
$F_{break}$: Force applied on the specimen at break (N)
A: Cross-section area of unstrained specimen (m$^2$)
The Elongation at Break ($E_{break}$) was determined as follows:

$$E_{break} = \frac{L_f - L_i}{L_i} \times 100$$

Where:
$L_i$: Initial Jaw Gap (mm)
$L_f$: Final Jaw Gap (mm)
These tensile properties have been measured using a Tinius Olsen Mechanical Tester (Model H10K-S).
The tensile tester was set up with the following conditions:
Initial Jaw Gap: 2.54 cm
Jaw type: tensile, width: 2.54 cm
Crosshead Speed: 500 mm/min
Load cell: 100N The initial gauge length was set at 2.54 cm by separating the instrument clamping jaws to this length and the sample was centered horizontally between the jaws so that an approximate equal length of sample was held by each jaw. The sample was tested at a crosshead speed of 500 mm/min until the sample broke or reached the maximum extension of the machine (100.0 cm). The tensile strength in pounds-force (and later converted to Newton) and elongation distance were recorded.

Five replicates were tested and averaged to provide the thickness (mm), Tensile Break Strength (MPa), and Elongation at Break (%).

Water Absorption Determination

For each sample three specimens of approximately 5.08 cm×2.54 cm were prepared and weighed on Mettler analytical balance (Model AE240) with a precision of 0.0001 g.

For the sample having a density lower than water, we used non-ferrous metallic ballasts.

Each specimens of a same sample were immersed together in a 120 ml glass jar filled with approximately 100 ml of distilled water.

The Water Absorption ($WA_X$) is defined as the percentage of mass change after X hours of immersion in water and is calculated as follows:

$$WA_X = \frac{m_X - m_0}{m_0} \times 100$$

Where:
$m_0$: initial mass of specimen in air (g)
$m_X$: mass of specimen in air after X hours of immersion (g)
The three replicates were averaged to provide the Water Absorption (%).

Examples 1-4

Four formulations containing various amounts of processing aid, Paraloid™ K-120ND were prepared and processed according to the methods of Formulation Preparation and Foam Extrusion previously described.

Details of the formulations are given in Table 2

TABLE 2

| Ex. No. | LA2250 (wt. %) | LA410L (wt. %) | Paraloid™ K-120ND (wt. %) | Ficel HRVP01 (wt. %) |
|---|---|---|---|---|
| 1 | 69.5 | 30 | 0 | 0.5 |
| 2 | 64.5 | 30 | 5 | 0.5 |
| 3 | 59.5 | 30 | 10 | 0.5 |
| 4 | 54.5 | 30 | 15 | 0.5 |

After Foam Extrusion, the resultant articles were then tested for structural properties (i.e. Density, Average Cell Diameter and Thickness) and mechanical properties (i.e. Tensile Break Strength and Elongation at Break) according to the corresponding test methods previously described.

As shown in Table 3, the addition of processing aid improved the cell structure (i.e. decrease the Average Cell Diameter, increase the Cell Homogeneity) and therefore, slightly improved the flexibility of the final sheet (i.e. increase the Elongation at Break by approximately 100%). This improvement of the flexibility is limited by the fact that Paraloid™ K-120ND, which is made of rigid polymeric chains (because of content of MMA), raises the composite Tg of the system, especially at high addition level (i.e. more that 10 wt. %). Consequently, the improvement of the flexibility due to the improvement of the cell structure on one side is balanced by the addition of high Tg material on the other side.

TABLE 3

| Ex. No. | Thickness (mm) | Density (g·cm$^{-3}$) | Average Cell Diameter (μm) | Cell Homogeneity (mm$^{-1}$) | Tensile Strength (MPa) | Elongation at Break (%) |
|---|---|---|---|---|---|---|
| 1 | 0.69 | 0.73 | 345 | 8.3 | 3.02 | 239 |
| 2 | 0.99 | 0.71 | 164.5 | 20.3 | 3.4 | 360 |
| 3 | 0.75 | 0.75 | 174 | 12.4 | 3.78 | 314 |
| 4 | 1.02 | 0.73 | 151 | 18.1 | 3.49 | 327 |

Examples 5-6

Two formulations containing various processing aids have been prepared and processed according to the methods of Formulation Preparation and Foam Extrusion previously described.

Details of the formulations are given in Table 4.

TABLE 4

| Ex. No. | LA2250 (wt. %) | LA410L (wt. %) | Paraloid™ K-130D (wt. %) | Paraloid™ K-445 (wt. %) | Ficel HRVP01 (wt. %) |
|---|---|---|---|---|---|
| 5 | 64.5 | 30 | 5 | 0 | 0.5 |
| 6 | 64.5 | 30 | 0 | 5 | 0.5 |

After Foam Extrusion, the resultant articles were then tested for structural properties (i.e. Density, Average Cell Diameter and Thickness) and mechanical properties (i.e. Tensile Break Strength and Elongation at Break) according to the corresponding test methods previously described.
Details of the formulations are given in Table 5.

TABLE 5

| Ex. No. | Thickness (mm) | Density (g·cm$^{-3}$) | Average Cell Diameter (µm) | Cell Homogeneity (mm$^{-1}$) | Tensile Strength (MPa) | Elongation at Break (%) |
|---|---|---|---|---|---|---|
| 5 | 0.89 | 0.61 | 137.3 | 16.8 | 3.10 | 383 |
| 6 | 0.85 | 0.62 | 161.0 | 14.6 | 3.27 | 377 |

Examples 7-11

Five formulations containing various processing aids have been prepared and processed according to the methods of Formulation Preparation and Foam Extrusion previously described.
Details of the formulations are given in Table 6.

TABLE 6

| Ex. No. | LA2250 (wt. %) | LA410L (wt. %) | Ficel HRVP01 (wt. %) | Soft PA1 (wt. %) | Soft PA2 (wt. %) | Soft PA3 (wt. %) | Soft PA4 (wt. %) |
|---|---|---|---|---|---|---|---|
| 7 | 59.5 | 30 | 0.5 | 10 | 0 | 0 | 0 |
| 8 | 59.5 | 30 | 0.5 | 0 | 10 | 0 | 0 |
| 9 | 59.5 | 30 | 0.5 | 0 | 0 | 10 | 0 |
| 10 | 59.5 | 30 | 0.5 | 0 | 0 | 0 | 10 |
| 11 | 64.5 | 30 | 0.5 | 0 | 0 | 0 | 5 |

Soft PA1, Soft PA2, Soft PA3 and Soft PA4 were prepared by blending an emulsion of Paraloid™ K-120ND with an emulsion of low T$_g$ acrylic homo- or copolymer. Soft PA1, Soft PA2 and Soft PA3 were freeze dried with dry ice then put in an oven at 60° C. for 24 hr to remove water. The rubbery chunks obtains were then broken down in pellets of approximately 5 mm diameter with a pair of scissors. Soft PA4 was obtained by spray drying and was available in powder form.
Poly(n-butyl acrylate) is an acrylic homopolymer made of 100 wt. % of n-butyl acrylate monomer. Poly(ethyl acrylate) is an acrylic homopolymer made of 100 wt. % of ethyl acrylate monomer. These polymers have been made by a typical aqueous emulsion polymerization method known in the prior art, such as the methods described in U.S. Pat. No. 20050250880.
Details of the components of the different Soft PAs are given in Table 7.

TABLE 7

| | Paraloid™ K-120ND (wt. %) | Poly(n-butyl acrylate) (wt. %) | ROBOND™ Prohesion 3000 (wt. %) | Elastene™ A10 (wt. %) | Poly(ethyl acrylate) (wt. %) |
|---|---|---|---|---|---|
| Soft PA1 | 50 | 50 | 0 | 0 | 0 |
| Soft PA2 | 50 | 0 | 50 | 0 | 0 |
| Soft PA3 | 50 | 0 | 0 | 50 | 0 |
| Soft PA4 | 50 | 0 | 0 | 0 | 50 |

After Foam Extrusion, the resultant articles were then tested for structural properties (i.e. Density, Average Cell Diameter and Thickness) and mechanical properties (i.e. Tensile Break Strength and Elongation at Break) according to the corresponding test methods previously described.
As shown in Table 8, the addition of these processing aids improve the cell structure (i.e. decrease the Average Cell Diameter, increase the Cell Homogeneity). The difference with the Paraloid™ K-120ND alone (see examples 1-4) consists in a higher improvement of the flexibility of the final sheet (i.e. increase of the Elongation at Break by approximately 200%). This higher improvement is due to the fact that these processing aids act to affect composite Tg than the Paraloid™ K-120ND alone.

TABLE 8

| Ex. No. | Thickness (mm) | Density (g·cm$^{-3}$) | Average Cell Diameter (µm) | Cell Homogeneity (mm$^{-1}$) | Tensile Strength (MPa) | Elongation at Break (%) |
|---|---|---|---|---|---|---|
| 7 | 0.84 | 0.56 | 129.9 | 21.6 | 3.02 | 426 |
| 8 | 0.82 | 0.58 | 136.7 | 21.4 | 2.96 | 407 |
| 9 | 0.77 | 0.68 | 161.0 | 17.4 | 2.93 | 391 |
| 10 | 0.61 | 0.85 | 150.7 | 17.1 | 4.60 | 424 |
| 11 | 0.67 | 0.82 | 94.9 | 26.0 | 4.54 | 483 |

Examples 12-15

Four formulations containing various lubricants, fillers or additives were prepared and processed according to the methods of Formulation Preparation and Foam Extrusion previously described.
Details of the formulations are given in Table 9.

TABLE 9

| Ex. No. | LA2250 (wt. %) | LA410L (wt. %) | Paraloid™ K-120ND (wt. %) | Ficel HRVP01 (wt. %) | Ceraflour 961 (wt. %) | Advalube F-1005 (wt. %) | Omyacarb UF (wt. %) | Paraloid™ B67 (wt. %) |
|---|---|---|---|---|---|---|---|---|
| 12 | 88.5 | 0 | 10 | 0.5 | 1 | 0 | 0 | 0 |
| 13 | 88.5 | 0 | 10 | 0.5 | 0 | 1 | 0 | 0 |
| 14 | 81.5 | 0 | 10 | 0.5 | 0 | 0 | 8 | 0 |
| 15 | 64.5 | 30 | 0 | 0.5 | 0 | 0 | 0 | 5 |

After Foam Extrusion, the resultant articles were then tested for Water Absorption according to the corresponding test method previously described. For comparison purpose we also measured the water absorption of a sample made according to the previously described Example 5.

Results of Water Absorption after 24 hrs and 360 hrs of immersion in water are given in Table 10.

TABLE 10

| Ex. No. | Water Absorption (wt. %) | |
|---|---|---|
| | 24 hrs | 360 hrs |
| 5 | 5.06 | 13.35 |
| 12 | 6.04 | 20.28 |
| 13 | 2.89 | 9.84 |
| 14 | 6.69 | 16.99 |
| 15 | 14.06 | 23.33 |

What is claimed is:

1. A flexible acrylic polymer foam composition comprising:
   A) an acrylic polymer comprising at least one acrylic tri-block copolymer;
   B) at least one processing aid wherein the at least one processing aid comprises
      i) a copolymer comprising at least two acrylic monomers;
      ii) a Tg between −50° C. and 130° C.;
      iii) a molecular weight comprised between 500,000 and 9,000,000; and
      iv) a difference of solubility parameters with at least one of the blocks of the tri-block copolymer of the acrylic polymer of equal to or less than 0.6 MPa$^{1/2}$; and
   C) at least one blowing agent.

2. The flexible acrylic polymer foam composition of claim 1 wherein the acrylic polymer is present in the foam composition in an amount between 60 wt. % and 99 wt. % based on total weight of the foam formulation.

3. The flexible acrylic polymer foam composition of claim 1 wherein the at least one processing aid is present in the foam composition in an amount between 1 wt. % and 40 wt. % based upon total weight of the foam formulation.

4. The flexible acrylic polymer foam composition of claim 1 wherein the acrylic polymer is a blend of two or more acrylic tri-block copolymers 5. The flexible acrylic polymer foam composition of claim 1 wherein the acrylic polymer is a blend of at least one acrylic triblock copolymer with at least one low Tg acrylic polymer wherein the at least one low Tg acrylic polymer has a Tg less than 0° C.

6. The flexible acrylic polymer foam composition of claim 1 wherein processing aid is a blend of two or more processing aids.

7. The flexible acrylic polymer foam composition of claim 1 wherein processing aid is a blend of one or more processing aid with one or more co-processing aids.

8. The flexible acrylic polymer foam composition of claim 1 further comprising between 0.5 to 5 wt % of one or more lubricants.

* * * * *